United States Patent
Huang

(10) Patent No.: US 10,401,646 B2
(45) Date of Patent: Sep. 3, 2019

(54) EYEGLASSES ASSEMBLY STRUCTURE

(71) Applicant: TSAIR YUARN INDUSTRIAL CO., LTD., Tainan (TW)

(72) Inventor: Pao-Ming Huang, Tainan (TW)

(73) Assignee: Tsair Yuarn Industrial Co., Ltd., Tainan (TW)

( * ) Notice: Subject to any disclaimer, the term of this patent is extended or adjusted under 35 U.S.C. 154(b) by 138 days.

(21) Appl. No.: 15/802,694

(22) Filed: Nov. 3, 2017

(65) Prior Publication Data
US 2019/0137783 A1 May 9, 2019

(51) Int. Cl.
*G02C 5/14* (2006.01)
*G02C 5/22* (2006.01)
*G02C 5/12* (2006.01)

(52) U.S. Cl.
CPC ........... *G02C 5/146* (2013.01); *G02C 5/2209* (2013.01); *G02C 5/12* (2013.01)

(58) Field of Classification Search
None
See application file for complete search history.

(56) References Cited

U.S. PATENT DOCUMENTS

2007/0216854 A1* 9/2007 Yang ................. G02C 1/04
351/90
2018/0252938 A1* 9/2018 Thorsell ............ G02C 1/02

FOREIGN PATENT DOCUMENTS

TW M506985 U * 8/2015 ............ G02C 5/20

* cited by examiner

*Primary Examiner* — Ricky L Mack
*Assistant Examiner* — Gary W O'Neill
(74) *Attorney, Agent, or Firm* — Rosenberg, Klein & Lee

(57) ABSTRACT

An eyeglasses assembly structure is disclosed herein. It comprises a lens having two connecting parts at two ends thereof, two assembly members, and a pair of temples respectively and pivotally connected to the two assembly members. Each of the two connecting parts of the lens has an orientation trough. Each of the two assembly members has an embedding slot for engaging with each of the two connecting parts of the lens and a button having a positioning block for correspondingly engaging with the orientation trough.

6 Claims, 5 Drawing Sheets

EYEGLASSES ASSEMBLY STRUCTURE

BACKGROUND OF THE INVENTION

1. Field of the Invention

This invention relates to an eyeglasses assembly structure which comprises a lens, a pair of temples, and assembly members for pivotally and steadily assembling the pair of temples to the lens.

2. Description of Related Art

Generally, a pair of sunglasses, sport glasses or the like has an engaging slot on two laterals of lenses assembly portions of a frame for pivotally connecting a pair of temples, and each side of the lenses also has an embedded flange. In assembling of the eyeglasses, the lenses are bent and deformed so that the embedded flanges on the two sides of the lenses can be embedded in the frame. After the bending force on the lenses is disappeared, the lenses back to its original shape so that the embedded flanges on the two sides of the lenses can be positioned in the engaging slots on two laterals of the lenses assembly portions of the frame.

In addition to providing vision correction, eye protection and the like, eyeglasses is also regarded as an important fitting for modeling dress. For some consumers who like to dress up, they usually buy many pairs of eyeglasses to wear for matching their clothes or on the different occasions. However, each pair of the traditional eyeglasses includes a frame and lenses, which may cause consumers a considerable economic burden if they want to purchase the frames and the lenses at the same time.

Although some kinds of the existing eyeglasses provide functions of replacement of the frames and lenses, they still have many disadvantages in the actual operation:

1. In assembling or disassembling of the eyeglasses, the lenses must be bent and deform so as to engage with the frame. This kind of assembling method takes much effort and easily causes lenses damage, which is not convenient in replacement of the frame and lenses.

2. The lenses are positioned on the frame merely by the two embedded flanges engaging with the engaging slots, so the pair of eyeglasses lacks structural stability on assembly. In such a case, the lenses may be easily detached from the frame when the lenses are subjected to external forces.

SUMMARY OF THE INVENTION

The present invention is aimed to provide an eyeglasses assembly structure which comprises a lens, a pair of temples, and assembly members for pivotally and steadily assembling the pair of temples to the lens.

The eyeglasses assembly structure of this invention mainly comprises:

a lens having two connecting parts at two ends thereof, wherein each of the two connecting parts has a guide groove horizontally on a sidewall thereof, an orientation trough at a terminal of the guide groove, and two rabbets respectively at a upper edge and a lower edge thereof, and wherein the orientation trough has a diameter greater than a width of the guide groove;

two assembly members respectively disposed on the two connecting parts at the two ends of the lens, each of the two assembly members having an embedding slot at an internal thereof, a though hole relative to the embedding slot on an end face thereof for communicating with the embedding slot, a button having a positioning block for inserting into the orientation trough of each of the two connecting parts, and an elastic member disposed between the positioning block and a wall of the embedding slot, wherein the embedding slot further has an opening at a lateral of each of the two assembly members for engaging with the two connecting parts of the lens, and wherein the button further has a linking segment connected to the positioning block for inserting into the guide groove, and a press part connected to the linking segment and relative to the though hole on the end face of each of the two assembly members; and a pair of temples respectively and pivotally connected to the two assembly members.

According to an embodiment of this invention, each of the two assembly members comprises a first assembly part and a second assembly part for respectively assembling to a front portion and a rear portion of each of the two connecting parts, and the first assembly part and the second assembly part further respectively have a concave part at an end face relative to the connecting part, the two concave parts further combined to form the embedding slot.

According to an embodiment of this invention, the first assembly part is provided with two inserting blocks, two lock holes respectively disposed on the two inserting blocks; and the second assembly part of each of the two assembly members is provided with two protrusions respectively at a upper edge and a lower edge of the concave part thereof and relative to the two inserting blocks of the first assembly part for correspondingly engaging with two rabbets respectively at a upper edge and a lower edge of each of the two connecting parts of the lens, two inserting troughs respectively disposed on the two protrusions for receiving the two inserting blocks of the first assembly part, and two lock holes on two lateral sides thereof relative to the two lock holes of the two inserting blocks of the first assembly part and respectively communicated with the two inserting troughs, the first assembly part locked and fixed on the second assembly part by two locking members respectively inserting into the two lock holes of the two inserting blocks of the first assembly part and into the two lock holes of the two inserting troughs of the second assembly part.

According to an embodiment of this invention, the concave part of the first assembly part of each of the two assembly members is provided with a receiving slot relative to the positioning block of the button, and the elastic member is disposed between the receiving slot of the first assembly part and the positioning block of the button.

According to an embodiment of this invention, the receiving slot of the first assembly part of each of the two assembly members is provided with a bolt at a center of bottom thereof for inserting into an aperture of the elastic member and positioning one end of the elastic member, and the positioning block is provided with a recess at a terminal thereof for positioning the other end of the elastic member.

According to an embodiment of this invention, the lens further has a nose pad assembly part at a central bottom edge thereof.

In assembling the eyeglasses assembly structure of the present invention, the two connecting parts at two ends of the lens are engaged with the two assembly members by the positioning blocks of the buttons of the two assembly members engaging with the two orientation troughs of the two connecting parts. Accordingly, the two assembly members can assemble the lens to the temples steadily. In replacing the lens or the temples, a user can detach the lens from the temples by pressing the buttons for releasing the positioning blocks of the buttons of the two assembly members from the two orientation troughs of the two connecting parts and then change temples with different colors or patterns so as to meet the demand of altering an overall appearance of the eyeglasses.

DETAILED DESCRIPTION OF THE PREFERRED EMBODIMENT

In the following detailed description, for purposes of explanation, numerous specific details are set forth in order to provide a thorough understanding of the disclosed embodiments.

Figure 1:
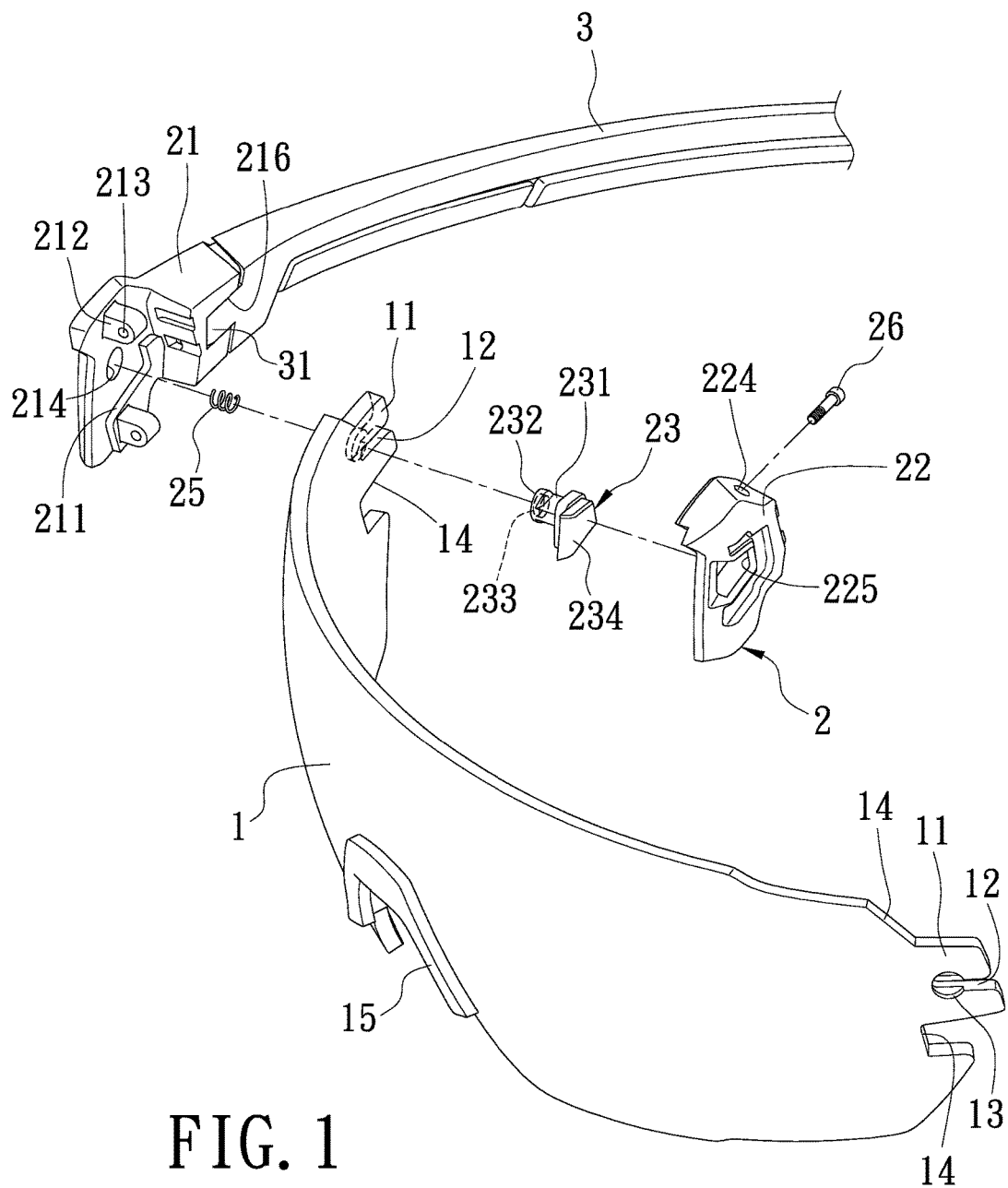
FIG. 1 is a first exploded diagram showing an eyeglasses assembly structure according to the present invention.
Figure 2:
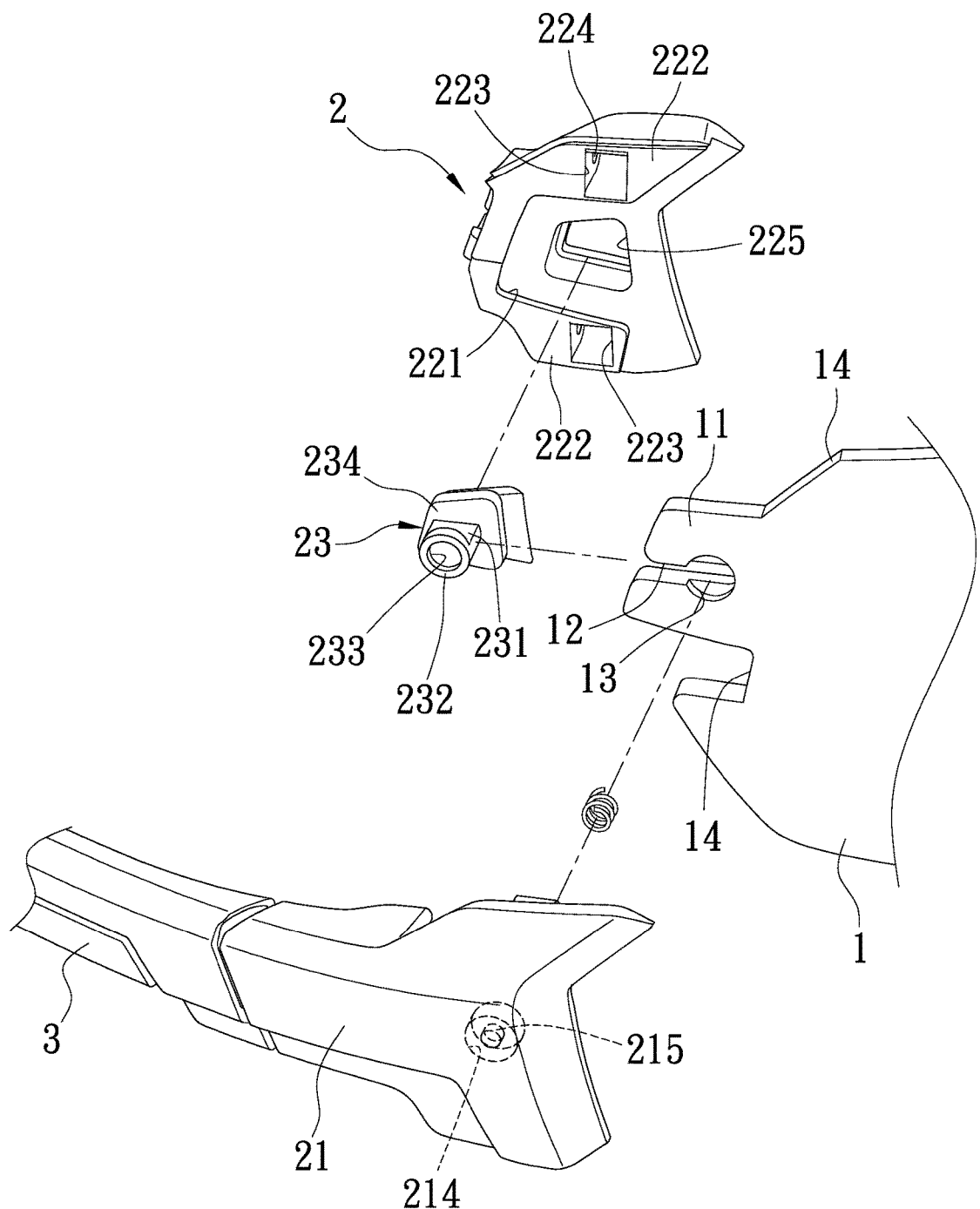
FIG. 2 is a second exploded diagram showing an eyeglasses assembly structure according to the present invention.

Referring to FIG. 1 and FIG. 2, an eyeglasses assembly structure mainly comprises:

a lens (1) having two connecting parts (11) at two ends thereof and a nose pad assembly part (15) at a central bottom edge thereof, wherein each of the two connecting parts (11) has a guide groove (12) horizontally on a sidewall thereof, an orientation trough (13) at a terminal of the guide groove (12), and two rabbets (14) respectively at a upper edge and a lower edge thereof, and wherein the orientation trough (13) has a diameter greater than a width of the guide groove (12);

two assembly members (2) respectively disposed on the two connecting parts (11) at the two ends of the lens (1), each of the two assembly members (2) comprising a first assembly part (21) and a second assembly part (22) for respectively assembling to a front portion and a rear portion of each of the two connecting parts (11), a button (23) having a positioning block (232) for inserting into the orientation trough (13) of each of the two connecting parts (11), an embedding slot (24) at an internal thereof for receiving the positioning block (232), a though hole (225) relative to the embedding slot (24) on an end face thereof for communicating with the embedding slot (24), and an elastic member (25) disposed between the positioning block (232) and a wall of the embedding slot (24), wherein the embedding slot (24) further has an opening at a lateral of each of the two assembly members (2) for engaging with the two connecting parts (11) of the lens (1), and wherein the button (23) further has a linking segment (231) connected to the positioning block (232) for inserting into the guide groove (12), and a press part (234) connected to the linking segment (231) and relative to the though hole (225) on the end face of each of the two assembly members (2) for assembling to the though hole (225); and a pair of temples (3) respectively and pivotally connected to the two assembly members (2).

Figure 3:
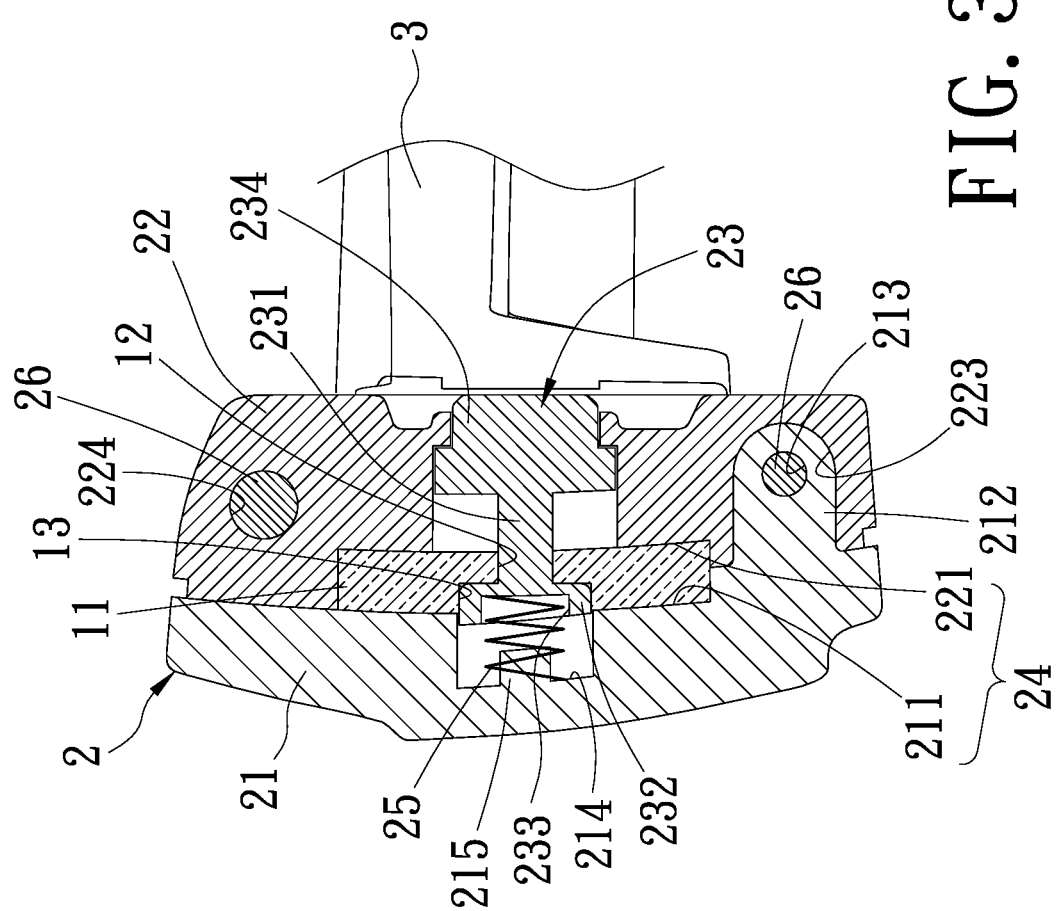
FIG. 3 is a cross-sectional diagram showing an eyeglasses assembly structure according to the present invention.

Accordingly to abovementioned description and as shown in FIG. 3, the first assembly part (21) and the second assembly part (22) further respectively have a concave part (211) (221) at an end face relative to the connecting part (11), the two concave parts (211) (221) further combined to form the embedding slot (24). The first assembly part (21) is provided with two inserting blocks (212), two lock holes (213) respectively disposed on the two inserting blocks (212). The second assembly part (22) is provided with two protrusions (222) respectively at a upper edge and a lower edge of the concave part (221) thereof and relative to the two inserting blocks (212) of the first assembly part (21) for correspondingly engaging with the two rabbets (14) respectively at a upper edge and a lower edge of each of the two connecting parts (11) of the lens (1); two inserting troughs (223) respectively disposed on the two protrusions (222) for correspondingly receiving the two inserting blocks (212) of the first assembly part (21); and two lock holes (224) on two lateral sides thereof relative to the two lock holes (213) of the two inserting blocks (212) of the first assembly part (21) and respectively communicated with the two inserting troughs (223). The eyeglasses assembly structure is further provided with two locking members (26) for respectively inserting into the two lock holes (213) of the two inserting blocks (212) of the first assembly part (21) and into the two lock holes (224) of the two inserting troughs (223) of the second assembly part (22) so as to lock and fix the first assembly part (21) on the second assembly part (22).

Furthermore, the concave part (211) of the first assembly part (21) is provided with a receiving slot (214) relative to the positioning block (232) of the button (23). The receiving slot (214) is provided with a bolt (215) at a center of bottom thereof for inserting into an aperture of the elastic member (25) and positioning one end of the elastic member (25). The elastic member (25) is a spring. The positioning block (232) is provided with a recess (233) at a terminal thereof for positioning the other end of the elastic member (25). In such a case, two ends of the elastic member (25) are respectively disposed on a bottom of the receiving slot (214) of the first assembly part (21) and the recess (233) at the terminal of the positioning block (232).

The first assembly part (21) is further provided with a temple bonding part (216) at the other end opposite to an end having the embedding slot (24). Each of the pair of temples (3) is further provided with a joint part (31) for pivotally connecting to the two assembly members (2) at the two ends of the lens (1) by the locking member (26).

Accordingly, in assembling the eyeglasses assembly structure of the present invention, the pair of temples is assembled to the two assembly members (2), and then the two assembly members (2) are assembled to the lens (1).

Figure 4:
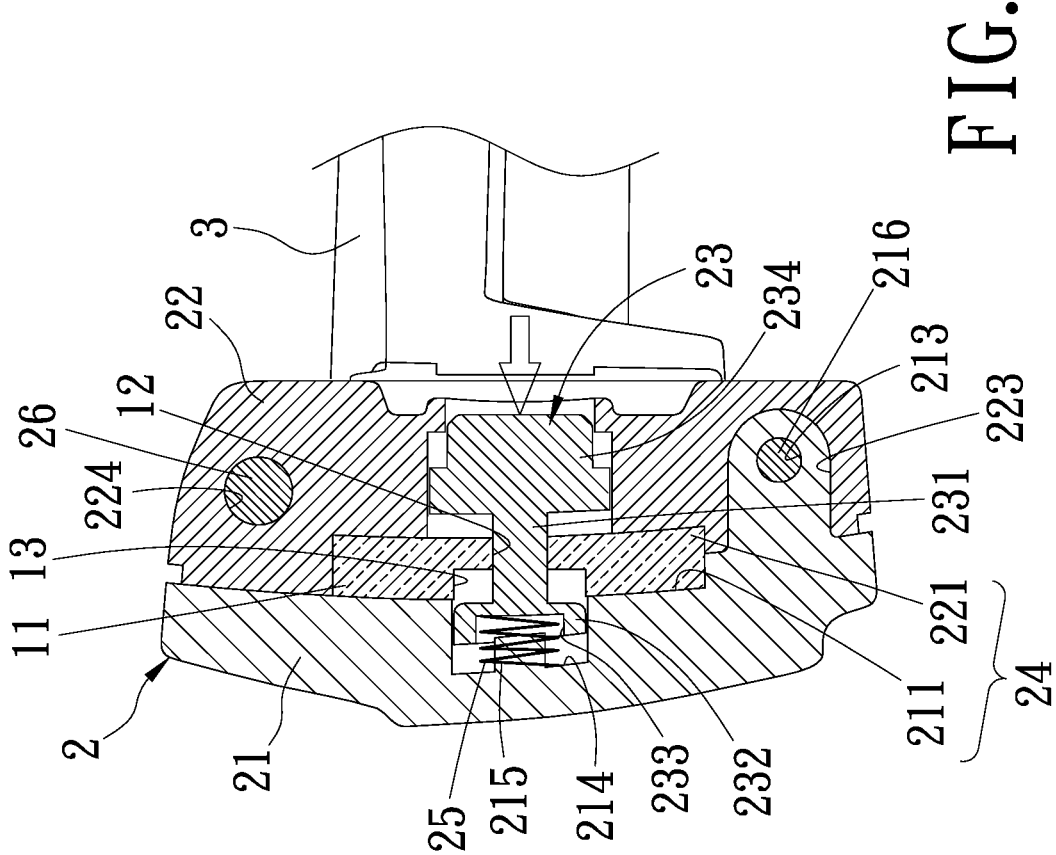
FIG. 4 is a cross-sectional diagram showing a temple is assembled to an assembly member and the lens.
Figure 5:
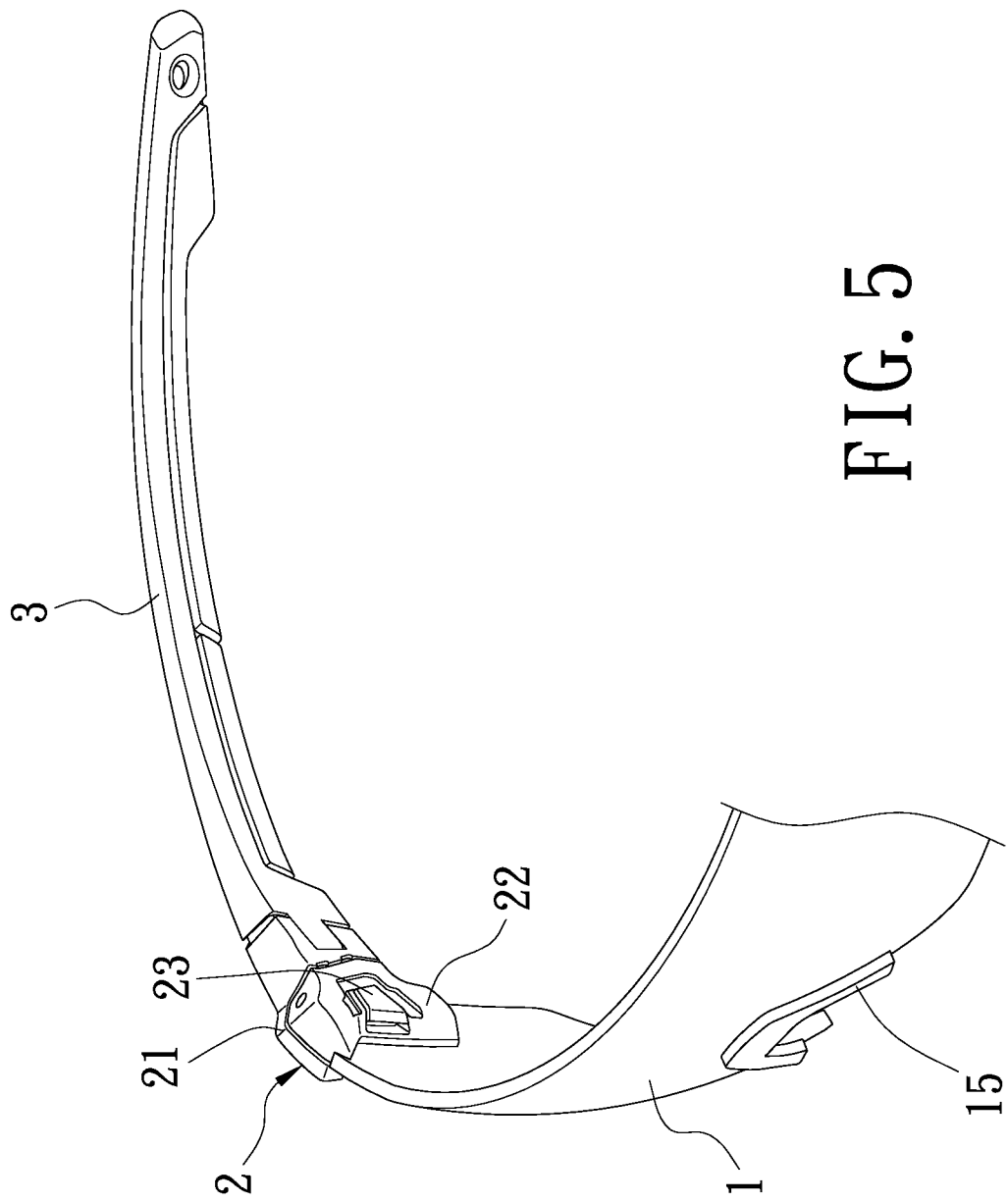
FIG. 5 is a stereogram showing an eyeglasses assembly structure in assembly according to the present invention.

Specifically, in assembling the assembly member (2) to the lens (1) as shown in FIG. 4, the press part (234) of the button (23) of each of the two assembly members (2) is pressed by a user for pushing the positioning block (232) of the button (23) into the receiving slot (214) of the first assembly part (21). In such a case, the elastic member (25) between the positioning block (232) and the receiving slot (214) of the first assembly part (21) is compressed. Then the connecting part (11) of the lens (1) is inserted into the embedding slot (24) of the assembly member (2) from an opening of the embedding slot (24). After the user stops pressing the button (23), the elastic member (25) between the positioning block (232) of the button (23) and the first assembly part (21) backs to its original state to push the positioning block (232) back to an original position, so the positioning block (232) is engaged with the orientation trough (13) of the connecting part (11) of the lens (1) for position. Therefore, the connecting part (11) of the lens (1) can be assembled to the assembly member (2) as shown in FIG. 5 and further assembled to the temple (3) which is previously pivotally connected to the assembly member (2)

by the same assembly method to complete the assembly of the eyeglasses assembly structure easily.

According to the eyeglasses assembly structure of the present invention, the lens (1) is engaged with the two assembly members (2) by the positioning blocks (232) of the buttons (23) engaging with the two orientation troughs (13) of the two connecting parts (11) of the lens (1). Accordingly, the lens (1) and the two assembly members (2) are not separated from each other unless the user intentionally presses the buttons (23), so the present invention has structural stability on assembly. In replacing the temples (3), the user can detach the lens (1) from the temples (3) by pressing the buttons (23) for releasing the positioning blocks (232) of the buttons (23) from the two orientation troughs (13) of the lens (1), and then change temples (3) with different colors or patterns so as to meet the demand of altering an overall appearance of the eyeglasses for matching their clothes on the different occasions.

What is claimed is:

1. An eyeglasses assembly structure, comprising:
    a lens having two connecting parts at two ends thereof, wherein each of the two connecting parts has a guide groove horizontally on a sidewall thereof, an orientation trough at a terminal of the guide groove, and two rabbets respectively at a upper edge and a lower edge thereof, and wherein the orientation trough has a diameter greater than a width of the guide groove;
    two assembly members respectively disposed on the two connecting parts at the two ends of the lens, each of the two assembly members having an embedding slot at an internal thereof, a though hole relative to the embedding slot on an end face thereof for communicating with the embedding slot, a button having a positioning block for inserting into the orientation trough of each of the two connecting parts, and an elastic member disposed between the positioning block and a wall of the embedding slot, wherein the embedding slot further has an opening at a lateral of each of the two assembly members for engaging with the two connecting parts of the lens, and wherein the button further has a linking segment connected to the positioning block for inserting into the guide groove, and a press part connected to the linking segment and relative to the though hole on the end face of each of the two assembly members; and
    a pair of temples respectively and pivotally connected to the two assembly members.

2. The eyeglasses assembly structure as claimed in claim 1, wherein each of the two assembly members comprises a first assembly part and a second assembly part for respectively assembling to a front portion and a rear portion of each of the two connecting parts, and wherein the first assembly part and the second assembly part further respectively have a concave part at an end face relative to the connecting part, the two concave parts further combined to form the embedding slot.

3. The eyeglasses assembly structure as claimed in claim 2, wherein the first assembly part is provided with two inserting blocks, two lock holes respectively disposed on the two inserting blocks, and wherein the second assembly part of each of the two assembly members is provided with two protrusions respectively at a upper edge and a lower edge of the concave part thereof and relative to the two inserting blocks of the first assembly part for correspondingly engaging with the two rabbets respectively at a upper edge and a lower edge of each of the two connecting parts of the lens, two inserting troughs respectively disposed on the two protrusions for receiving the two inserting blocks of the first assembly part, and two lock holes on two lateral sides thereof relative to the two lock holes of the two inserting blocks of the first assembly part and respectively communicated with the two inserting troughs, the first assembly part locked and fixed on the second assembly part by two locking members respectively inserting into the two lock holes of the two inserting blocks of the first assembly part and into the two lock holes of the two inserting troughs of the second assembly part.

4. The eyeglasses assembly structure as claimed in claim 2, wherein the concave part of the first assembly part of each of the two assembly members is provided with a receiving slot relative to the positioning block of the button, and wherein the elastic member is disposed between the receiving slot of the first assembly part and the positioning block of the button.

5. The eyeglasses assembly structure as claimed in claim 4, wherein the receiving slot of the first assembly part of each of the two assembly members is provided with a bolt at a center of bottom thereof for inserting into an aperture of the elastic member and positioning one end of the elastic member, and wherein the positioning block is provided with a recess at a terminal thereof for positioning the other end of the elastic member.

6. The eyeglasses assembly structure as claimed in claim 1, wherein the lens further has a nose pad assembly part at a central bottom edge thereof.

* * * * *